United States Patent
Hoon et al.

(10) Patent No.: US 8,476,878 B2
(45) Date of Patent: Jul. 2, 2013

(54) STARTUP CIRCUIT FOR DC-DC CONVERTER

(75) Inventors: Siew K. Hoon, Los Altos, CA (US);
Mengzhe Ma, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 438 days.

(21) Appl. No.: 12/946,158

(22) Filed: Nov. 15, 2010

(65) Prior Publication Data

US 2012/0120688 A1  May 17, 2012

(51) Int. Cl.
*G05F 1/59* (2006.01)

(52) U.S. Cl.
USPC ............ 323/271; 323/222; 323/282; 323/901

(58) Field of Classification Search
USPC .......................... 323/222, 271, 282, 351, 901
See application file for complete search history.

(56) References Cited

U.S. PATENT DOCUMENTS

| | | | | |
|---|---|---|---|---|
| 8,138,735 B2 * | 3/2012 | Ivanov | | 323/284 |
| 8,169,802 B2 * | 5/2012 | Kim et al. | | 363/49 |
| 8,278,887 B2 * | 10/2012 | Williams | | 323/223 |
| 2012/0120688 A1 * | 5/2012 | Hoon et al. | | 363/49 |

* cited by examiner

*Primary Examiner* — Jeffrey Sterrett
(74) *Attorney, Agent, or Firm* — Wade J. Brady, III; Frederick J. Telecky, Jr.

(57) ABSTRACT

A startup circuit for use in a DC-DC converter having an input voltage terminal and an output voltage terminal, with the output voltage terminal connected to an output capacitor and with said converter including a pass transistor for transferring charge from the input terminal to the output terminal. The startup circuit includes a control circuit configured to cause the pass transistor to conduct an output current during start up when the output terminal voltage is approaching a final regulated voltage, with the output current being comprised of first and second current components, with the first current component being proportional to the output voltage and the second current component being proportional to the input voltage, with the two components being combined so as to resist changes in the power dissipation in the pass transistor during startup.

20 Claims, 4 Drawing Sheets

STARTUP CIRCUIT FOR DC-DC CONVERTER

BACKGROUND OF THE INVENTION

1. Field of the Invention

The present invention relates generally to DC-DC converters and more particularly to startup circuitry for controlling power dissipation at converter start up when driving large capacitive loads.

2. Description of Related Art

DC-DC converters are commonly employed to provide varying regulated output voltages using an input power source. In many typical applications, a converter provides a regulated DC output voltage which is larger than the DC input voltage. Such converters are frequently referred to as boost (or step up) converters as opposed to buck (or step down) converters that which provide output voltages smaller than the output. Boost converters include an inductor having one terminal connected to a voltage input with that same terminal also being connected to ground by a first switching transistor. The other inductor terminal is connected to the converter output by way of a second switching transistor. During one phase of a switching cycle the inductor is connected to ground by way of the first switching transistor so that the inductor becomes charged. During a second phase of that switching cycle, the inductor is discharged to a load by way of the second transistor. During that second phase, the voltage drop across the inductor is added to the input voltage to provide a boosted output voltage. The switching duty cycle determines the magnitude of the output voltage. A filter capacitor is present at the output to form an output filter.

During the start up of a boost converter, the output voltage is at or near ground potential. The discharged filter capacitor must be charged so that the voltage across the capacitor reaches the desired regulated output voltage. In some applications, the capacitor is what is commonly referred to as a super capacitor having a capacitance much larger than a typical capacitor. Super capacitor values on the order of 0.05 to 1.9 Farads are not unusual. FIG. 1 shows part of a prior art boost (step up) converter 10 which is configured for startup operation, with the transistor drive circuitry for normal operation not being depicted. During normal converter operation, transistors T1 and T2 are driven in anti-phase. Transistor T1 periodically connects one terminal of the inductor L to ground (while T2 is off) so that the inductor is charged by the input voltage Vin. After inductor charging, transistor T2 is turned on (just after T1 is turned off) so that the charge on the inductor is transferred to the load connected to Vout.

When configured for startup operation, N type transistor T1 is maintained off as indicated by the gate connection to ground. P type transistor T2 is configured as a relatively fixed current source which provides output current Iout to charge capacitor Cs from near ground potential to the normal output voltage Vout. As used herein, the startup phase of boost converter operation begins when the output voltage Vout of the converter begins to increase in value and ends when Vout has nearly reached the fixed input voltage Vin in value. Since the output voltage Vout will be greater than Vin, Vout will continue to increase to its final value, but this action is not considered part of the startup phase.

Transistor T2 is connected relative to another P type transistor T3 to form a current mirror circuit. Since the current through the inductor L will be relatively fixed during start up, the voltage drop across the inductor will be minimal so that the source electrode of T2 is essentially at the same potential as the source electrode of T3, namely Vin. The gate electrodes of T2 and T3 are connected together and to the drain of T3 to complete the mirror circuit. The area of T2 is N time larger than that of T3 so that T2 will conduct N times the current of T3. A fixed current source 11 is connected to draw a current I1 though transistor T3 so that the output current Iout will be N times larger than I1. In order to conserve power, N is made relatively large.

The block diagram of FIG. 2 show the FIG. 1 circuitry where block 10 represents the converter and block 12 represents the relatively constant current provided by the current mirror made up of transistors T2 and T3.

In order to reduce the turn on time of regulator 10 it is desirable to maximize the magnitude of Iout while not damaging the converter, with T2 being the primary component of concern. Assume for example, that the T2 is part of an integrated circuit having a junction-to-ambient thermal resistance $\theta_{JA}$ of 70° C./W with this value being largely determined by the circuit packaging. Assume also that there is a specified thermal shutdown temperature of 125° C. at which point temperature sensing circuitry will operate to shut the converter down to prevent damage. The temperature of the junction is given by the following equation:

$$T_{TSD} = T_A + (W\text{max})(\theta_{JA}) \qquad \text{Eq. (1)}$$

where
  $T_{TSD}$ is the junction temperature for thermal shutdown (125° C.);
  $T_A$ is the ambient temperature (40° C.);
  Wmax is the maximum power dissipation; and
  $\theta_{JA}$ is thermal resistance (70° C./W).

Solving for Wmax, the maximum power dissipation allowed to avoid thermal shutdown is about 1.21 Watts. The worst case voltage drop across pass transistor T2 is Vin−Vout, with Vin typically being +5 volts and Vout being 0 volts at the beginning of start up. The maximum permitted current Iout to avoid thermal shutdown is (5 v−0 v)/1.21 W=242 mA. Thus, the current I1 provided by current source 11 is set to 242 mA.

FIG. 3A is a waveform 14 showing the current output Iout during start up assuming that the input voltage Vin is +5 volts. The current reaches a peak value of about 240 mA (point 14a) and then drops somewhat as the voltage (Vin-Vout) across T2, which forms the output transistor of the current mirror, drops. As the drain-source voltage of T2 becomes relatively small, transistor T2 no longer acts like a current source that mirrors the current in T3, so the current level begins to drop due to the so-called Early effect. However, as can be seen in FIG. 3B, at the beginning of the turn on process, the power dissipation in T2 is limited to a maximum Wmax of 1.21 watts when the voltage across T2 is at a maximum. Thus, it can be seen that the temperature will be maintained at less than the thermal shut down temperature of $T_{TSD}$ of 125° C. The tradeoff in limiting the current in this manner is that the turn on period required for Vout to reach a final value of +5 volts is over six seconds as can be seen in FIG. 3C by waveform 18. As the final value of +5 volts is approached, the step up converter regulator becomes active to further increase Vout to a predetermined regulated output voltage which will be greater than Vin. As used herein converter startup duration $T_{SU}$ is defined as the amount of time required for the converter output to transition from an output equal to 10% of the converter final startup value of Vin to an output equal to 90% of that final startup value. As can be seen in FIG. 3c the startup duration $T_{SU}$ as defined herein is between 4 and 5 seconds.

There is a need for a converter startup circuit which is capable of safely reducing the turn on time of the converter even when super capacitors are used. As will become apparent from the following Detailed Description of the Invention when read in combination with the drawings, the present invention meets this and other needs.

DETAILED DESCRIPTION OF THE INVENTION

Figure 4:
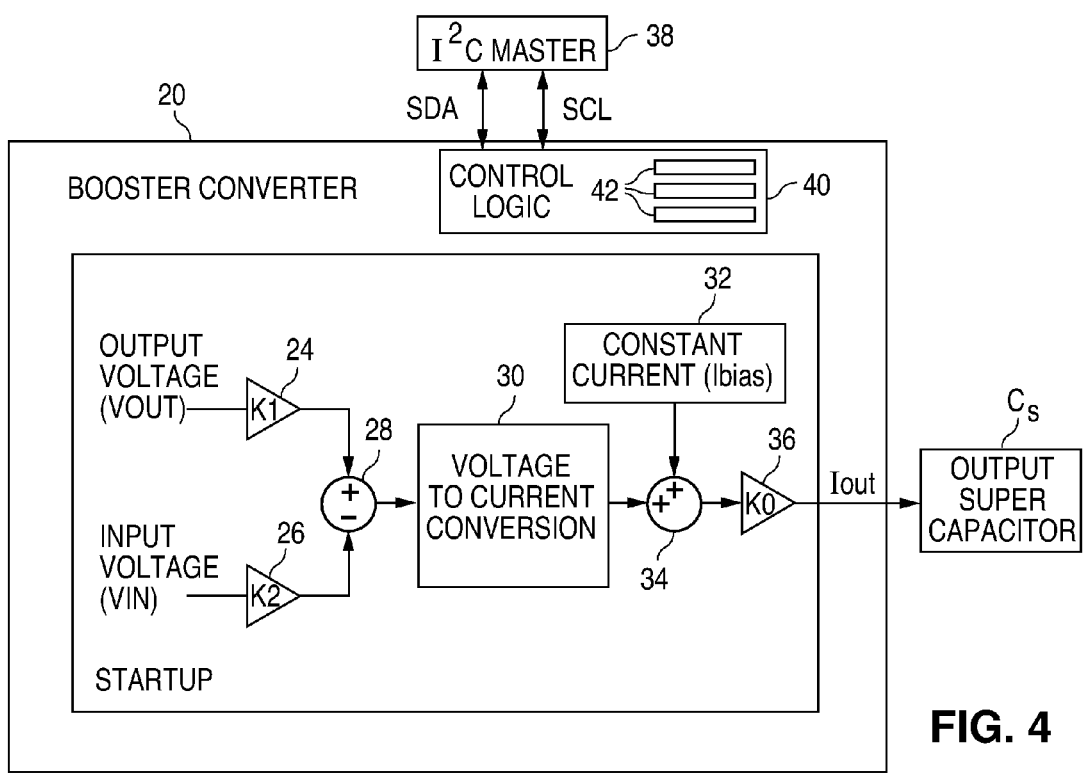
FIG. 4 is a block diagram illustrating a startup circuit in accordance with one embodiment of the present invention as part of a boost converter, with the converter including control logic having associated registers for storing data (circuit values) relating to startup circuit operating parameters which may be programmed and reprogrammed by an end user over an I2C bus.
Figure 2:
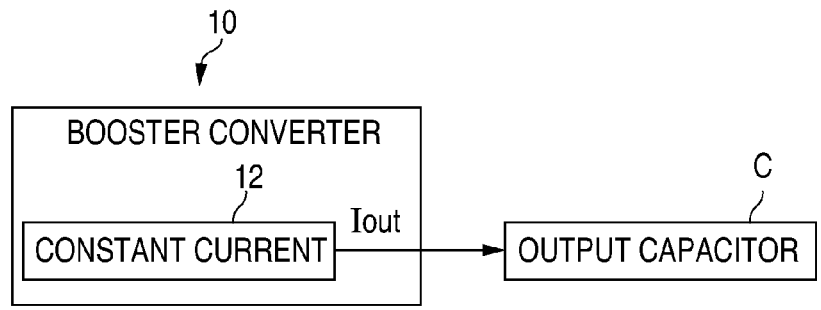
FIG. 2 is a simplified block diagram of the FIG. 1 converter.

Referring again to the drawings, FIG. 4 shows a boost converter 20 which includes a circuit model of one embodiment of a startup circuit 22. For purposes of clarity, FIG. 4 does not include much of the conventional converter circuitry, including the switching transistors and the inductor. As will be described in greater detail, circuit 22 provides an output current Iout which functions to charge the output capacitor Cs of the converter during start up. Cs may be a super capacitor. During normal step up (boost) converter operation, the input voltage Vin is smaller than the final regulated output voltage Vout. At the beginning of start up, Vout is near ground potential and increases over time as capacitor Cs becomes charged to Vin. As previously noted, once Vout has approached Vin in magnitude, the startup phase has ended, with normal regulation commencing so that Vout will reach a final regulated value.

As will be described, the output current Iout during the startup phase is preferably comprised of three current components. One component is made proportional to the varying output voltage Vout, another component is made proportional to the input voltage Vin and a third component is fixed and is thus not dependent upon either Vin or Vout. As previously discussed in connection with equation (1) above, assuming a thermal resistance $\theta_{JA}$ of 70° C./W, an ambient temperature $T_A$ of 40° C. and a thermal shutdown temperature $T_{TSD}$ of 125° C., the maximum allowable dissipation Wmax is 1.21 watts. (Note that if transistor T2 is a discrete transistor, the thermal resistance $\theta_{JA}$ for the transistor packaging is used instead of thermal resistance of the integrated circuit packaging.) In the event a minimum startup phase duration is the objective, the output current Iout should be adjusted to mirror the changes in voltage across the converter so as to maintain the power dissipation at or near Wmax though out the startup phase.

As indicated by diagram of FIG. 4 and as noted above, the output current Iout magnitude during startup is comprised of three components. A first component is derived from circuit 24 which produces an output voltage equal to K1×Vout with K1 being a constant. A second component is derived from circuit 26 which produces an output voltage equal to K2×Vin with K2 being a constant. The second voltage is subtracted from the first voltage as indicated by circuit element 28, the voltage output being converted to a current output by converter 30. The current output, which includes the two current components, is then added to the current output of a fixed current source 32 that produces Ibias. In order to conserver power, these internal currents are maintained at a small level, with the sum of the currents being increased by a factor of K0 by circuit 36 to arrive at the final output current Iout. Thus, the output current Iout can be expressed as follows:

$$Iout = K0(Ibias + Ib2 - Ib1) \qquad \text{Eq. (2)}$$

where
  Ibias is fixed;
  Ib2 is f(K2, Vout);
  Ib1 is f(K1, Vin); and
  K0, K1 and K3 are constants.

As previously described, in order to minimize the startup phase duration while not exceeding the maximum allowed power dissipation at any time during that phase, the following conditions should be met:

$$Wmax = Iout(Vin - Vout) \qquad \text{Eq. (3)}$$

or $$Iout = Wmax/(Vin - Vout) \qquad \text{Eq. (4)}$$

As will be described later, constants K0, K1 and K2 along with the value of Ibias are part of the previously noted startup circuit operating parameters having associated circuit values that can be controlled, either directly or indirectly, by an end user to provide the desired startup characteristics for a particular application. This can be accomplished using, by way of example, the well known I2C serial bus shown in FIG. 4, which includes a two way data line SDA and a clock line SCL. An end user is able to program and reprogram various converter parameters using a bus master 38 connected to a bus slave present in the converter control logic 40, with the bus enabling the user to program and reprogram various converter circuit values which are stored in registers 42. By adjusting these circuit values, the end user can modify the characteristics of the output current Iout.

Figure 5:
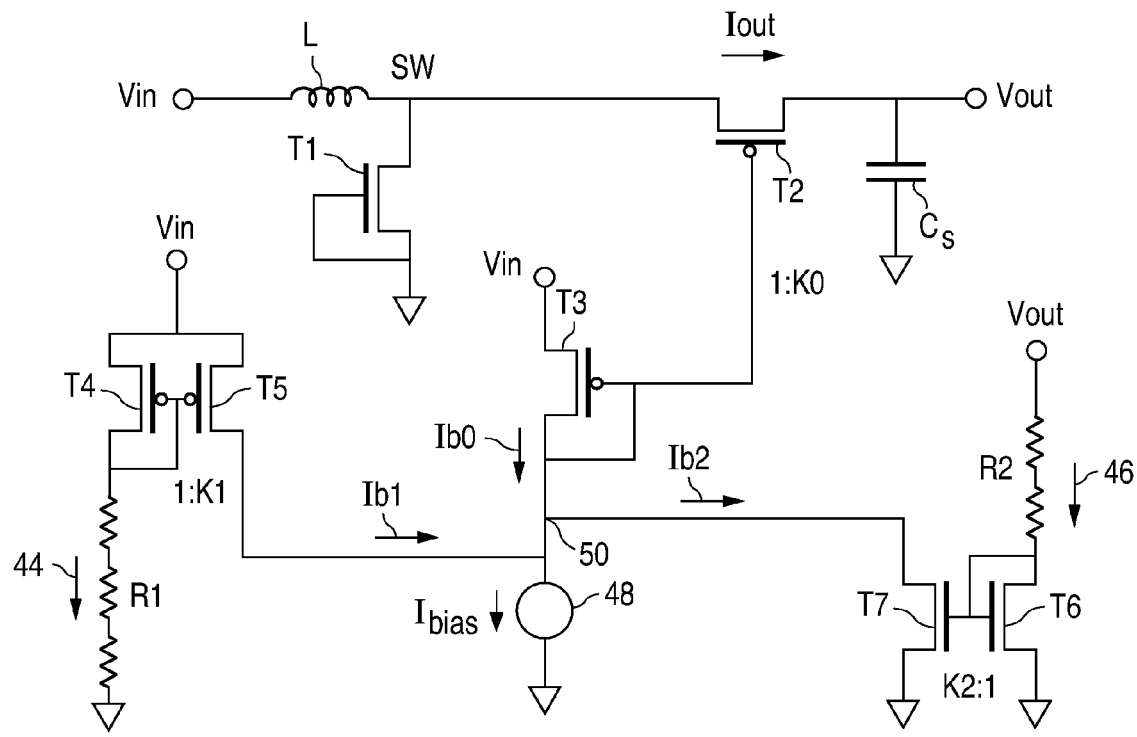
FIG. 5 is a circuit diagram of startup circuit in accordance with another embodiment of the present invention which forms part of a DC-DC converter.
Figures 3A, 3B, 3C:
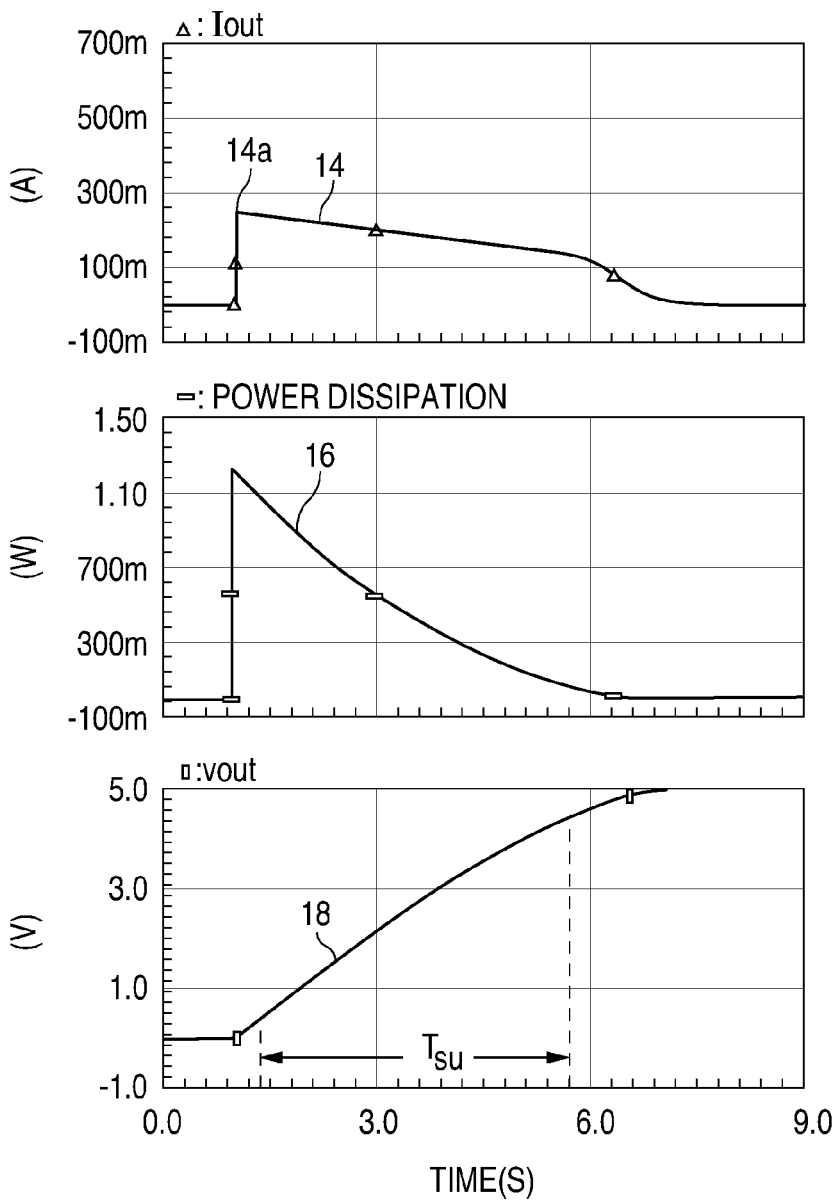
FIGS. 3A, 3B and 3C are timing diagrams showing the respective output current, power dissipation and output voltage waveforms of the prior art converters of FIGS. 1 and 2.

FIG. 5 is a schematic diagram of one circuit implementation of the FIG. 4 startup control circuitry. An inductor L is connected between the input terminal for receiving the input voltage Vin and a node SW. An N type switching transistor T1 is connected between node SW and ground and is maintained in an off state during start up as represented by the grounded gate connection. A large P type transistor T2 functions as a pass transistor during start up and provides the output current Iout to the filter super capacitor Cs. A second P type transistor T3 has a source connected to the input terminal for Vin and a gate/drain connection to the gate of T2 to form a current mirror circuit. The area ratio of T3/T2 is 1:K0, with K0 being the above-noted constant. K0 has a relatively large value so that the current flow Ibo in transistor T3 is small compared to the output current Iout. The current input to the T2/T3 current mirror is current Ib0, with this current being formed from a combination of three other currents as explained below.

P type transistors T4 and T5 are connected to one another to form a second current mirror having an area ratio of 1:K1. K1 is the previously noted constant. The common source connection of T4/T5 is connected to the input terminal for receiving the input voltage Vin. A current 44 forms an input to the T4/T5 current mirror and is produced by virtue of a voltage drop across resistor R1 equal to Vin less the threshold voltage Vtp of N type transistor T4. Current 44 is multiplied by a factor of K1 to produce current Ib1 as follows:

$$Ib1 = K1(Vin - Vtp)/R1 \qquad \text{Eq. (5)}$$

N type transistors T6 and T7 are also connected as current mirrors, with the area ratio being K2:1, with K2 being the previously noted constant. A voltage drop of Vout less the threshold voltage Vtn of N type transistor T6 is dropped across a resistor R1 to provide an input current 46 to the current mirror. Current 46 is multiplied by a factor of K2 to produce current Ib2 as follows:

$$Ib2 = K2(Vout - Vtn)/R2 \qquad \text{Eq. (6)}$$

A fixed current source 48 provides current Ibias, with the various currents being provided to a common current summing node to produce current Ib0 as follows:

$$Ibo = Ibias + Ib2 - Ib1 \qquad \text{Eq. (7)}$$

Since Iout is equal to K0(Ib0), the relationship of Eq. (2) results.

Table 1 below shows some typical values for the FIG. 5 circuit where, among other things, Vin=+5 volts and Wmax is 1.21 watts. Table 1 also shows the expected ranges for some of the values.

TABLE 1

| K0 | 17065 | (3000 < K0 < 30,000) |
| --- | --- | --- |
| K1 | 1 | |
| K2 | 2 | |
| R1 | 350 kΩ | (100 kΩ < R1 < 1 MΩ) |
| R2 | 350 kΩ | (100 kΩ < R2 < 1 MΩ) |
| Ibias | 25 μA | |

In order to minimize the startup phase duration while not exceeding the maximum power dissipation, the current Iout should be controlled to maintain the following equalities:

$$Wmax = (Vin - Vout) \times Iout \qquad \text{Eq. (8)}$$

where $$Iout = K0[Ibias + K2(Vout - Vtn)/R2 - K1(Vin - Vtp)/R1] \qquad \text{Eq. (9)}$$

The time response of the output current Iout during the startup phase can be optimized to ensure that for a given set of operating conditions, Iout is controlled to inversely mirror the change in voltage (Vin−Vout). This is carried out by potentially modifying the values in Table 1 for a particular set of differing operating conditions. As previously noted the values of K0, K1 and K2 are determined by the area ratios of the relevant current mirrors. Current mirror ratios are typically achieved by using multiple transistors for either the output and/or the input transistor. By way of example, transistors T4 and T5 can provide a ratio of 1 where T1 and T2 may each be implemented with five transistors connected in parallel. It is possible to electrically add or subtract one or more of the ten transistors to change the ratio from 1 to some other value. By way of example, one of the five transistors that form T4 could be temporarily electrically switched off to provide a mirror ratio of 4:5 or 0.8.

Figures 6A, 6B, 6C:
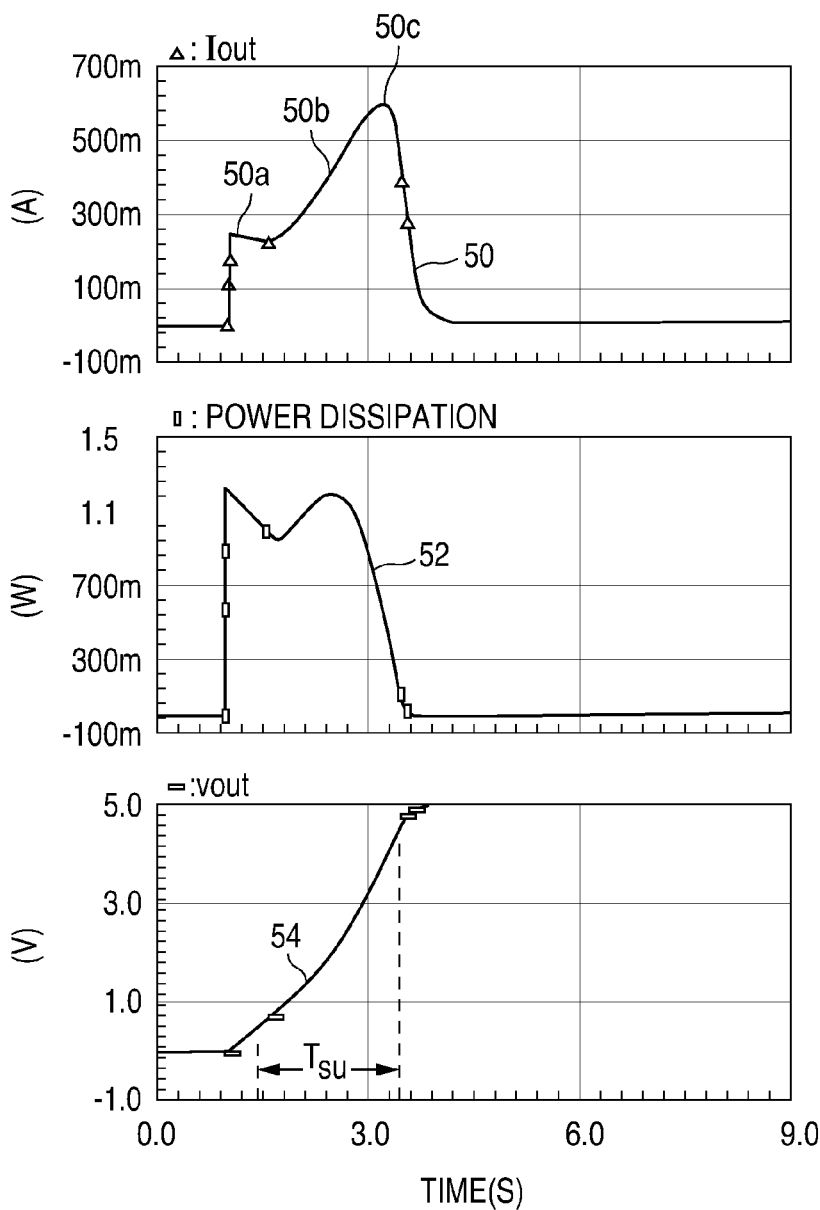
FIGS. 6A, 6B and 6C are timing diagrams showing the respective output current, power dissipation and output voltage waveforms for the FIG. 5 converter.

FIG. 6A shows the manner in which the FIG. 5 circuit controls the output current Iout throughout the startup phase. The exemplary waveform 50 assumes that the input voltage Vin is at +5 volts and the maximum allowable power dissipation Wmax is 1.21 watts, with this value of Wmax being determined by an assumed thermal resistance $\theta_{JA}$ of 70° C./W, an ambient temperature $T_A$ of 40° C. and a thermal shutdown temperature $T_{TSD}$ of 125° C. as previously noted. During the initial part of the startup phase, the startup circuit does not wake up for about the first 1 second. As can be seen in the FIG. 6C waveform 54, at the end of the wakeup, the output voltage Vout is near ground so that the voltage across T2 is at a maximum value of +5 volts. Thus, the output current Iout will be at some relatively small value to maintain the power dissipation level at Wmax=1.21 W.

As can be seen from Eq. (9), the Iout current 50a at the beginning of the start up is set by the fixed terms K0[Ibias−K2(Vin−Vtp)/R1] which be 1.21 W/5 volts or about 242 mA as indicated by FIG. 6A. As Vout begins to increase, the voltage across transistor T2 will drop so that the output current Iout will increase in value to maintain a constant dissipation Wmax while also minimizing the duration of the startup phase. Thus, the K2(Vout−Vtn)/R2 component will add to the fixed component as shown in the FIG. 6A diagram starting around about 1.5 seconds to produce section 50b of the current waveform. The value of Iout will increase as Vout increases until the voltage across transistor T2 is near zero (Vout=Vin). At this point, the output current could theoretically approach infinity without exceeding Wmax. Given the real world circuitry of FIG. 5, Iout only increases to about 600 mA before Vout reaches Vin which ends the startup phase at about 3.5 seconds to produce section 50c of the waveform. At that point, the current mirror formed by T2 and T3 collapses as does the output current Iout. Normal converter regulation then takes over, with T1 and T2 being switched to provide the voltage step up function.

Figure 1:
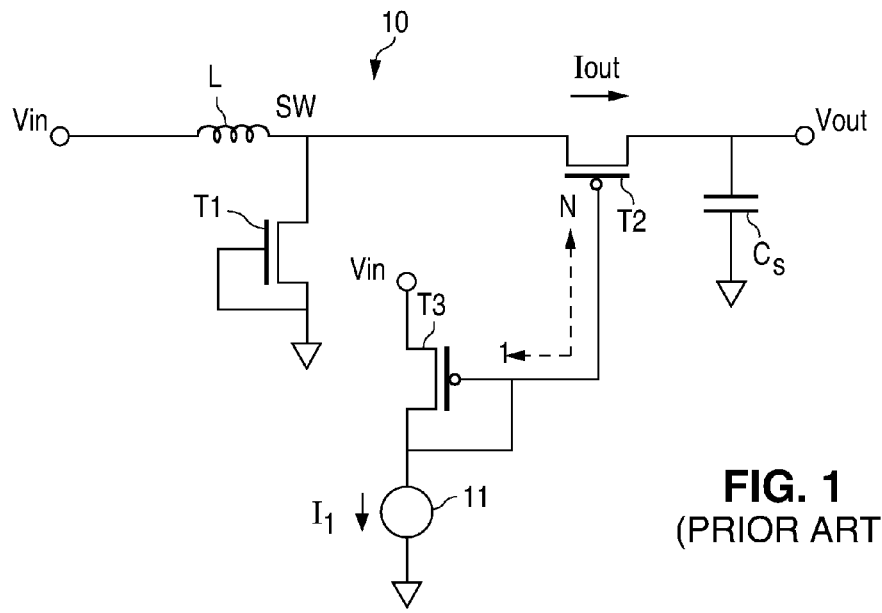
FIG. 1 is a simplified circuit diagram of a part of a prior art DC-DC converter configured for startup operation.

As can be seen from FIG. 6C, the startup duration $T_{SU}$ as previously defined for the FIG. 1 circuit is only about 2 seconds with that being a considerable improvement over the startup duration of 4 to 5 seconds provided by the FIG. 1 prior art circuit for the same operating conditions. Preferably, the startup circuit operates to maintain the power dissipation within at least ±20% of some target power dissipation value for a period of time equal to at least half the startup duration $T_{SU}$, as the amount of time required for the converter output to transition from an output equal to 10% of the converter final startup value of Vin to an output equal to 90% of that final startup value. If a minimum startup duration $T_{SU}$ is the objective, then that target power dissipation should be such that the actual dissipation approaches but never exceeds Wmax.

The selection of the appropriate Table 1 variables will be straightforward to a person of even less than average skill in the present technology. When selecting the values of the large resistors R1 and R2, the available die area, the acheivable precision and current restraints need to be taken into account. Similarly, available die area and precision need to be taken into account when selecting the value of K0, with that value being determined by the respective transistor areas that form the T2/T3 current mirror. When selecting the values of K1, K2 and Ibias, it is helpful to evaluate Eq. (8) and Eq. (9) near the beginning and near the end of the startup period. Once the value of Wmax has been determined, that value is substituted into Eq. (8). In addition, the expression for Iout in Eq. 9 is also substituted into Eq. 8. At the beginning of the startup phase, Vout will be zero so that when Vin max is substituted into Eq. 9 the following relationship must be maintained:

$$Wmax = K0[Ibias - K1(Vin\,max - Vtp)/R1](Vin\,max) \qquad \text{Eq. (10)}$$

Furthermore, inspection of Eq. 10 shows that the following relationship must also be maintained, otherwise current flow will be in the wrong direction:

$$Ibias > K1(Vin\,max - Vtp)/R1 \qquad \text{Eq. (11)}$$

In order to have relatively constant power consumption approaching the end of the startup period, it can be assumed Vout has increased to near halfway to its final value of (Vout max)/2. Assuming also that the input voltage Vin is at a maximum value and then substituting these values into Eqs. (8) and (9) produces the following relationship which must also be maintained when selecting K1, K2 and Ibias:

$$Wmax=K0[Ibias+K2(Vout\ max/2-Vtn)/R2-K1(Vin\ max-Vtp)/R1](Vin\ max-Vout\ max/2)\ Eq. \quad (12)$$

In addition to the guidance provided above, perhaps the most expedient method of selecting the Table 1 variables for a particular application is to utilize one of the well know circuit simulation programs such as Spice. This allows a user to try one or more values for the variables in the table and then quickly determine using simulation if the desired circuit operation has been achieved.

The variables listed in Table 1 can be varied, either directly or indirectly, using the I2C bus depicted in FIG. 4. By way of example, if the converter chip is mounted on a large heat sink, the thermal resistance $\theta_{JA}$ of 70° C./W will be lower so that Wmax can be increased. In addition, a user may want to be able to select a startup phase duration from a choice of several preselected times using the I2C bus. This would enable the user to accommodate certain types of super capacitors Cs where the operating life can be extended using lower charging rates. These and other readily apparent examples demonstrate the flexibility of the present invention.

Thus, a various embodiments of a novel converter startup circuit have been disclosed. Although these embodiments have been described in some detail, it is to be understood that various changes can be made by those skilled in the art without departing from the spirit and scope of the invention as defined by the appended claims. By way of example, the order in which the three current components K0(Ibias), K1(Ib2) and K0(Ib1) of Eq. (2) are produced and combined is not critical. In other words, the combining process is cumulative. As an example, FIG. 4 shows that current component Ib2–Ib1 produced at the output of circuit 30 and then added to current component Ibias by current combiner 34, with the final result being multiplied by constant K0 to produce Iout. As another example, FIG. 5 shows Ib1, Ib2 and Ibias being possibly generated at the same time and combined at the same time at node 50, where the combination is then multiplied by constant K0 to produce Iout.

What is claimed is:

1. A startup circuit for use in a DC-DC converter having an input voltage terminal and an output voltage terminal, with the output voltage terminal connected to an output capacitor and with said converter including a pass transistor for transferring charge from the input terminal to the output terminal, said start up circuit comprising:
a pass transistor control circuit configured to cause the pass transistor to conduct an output current during start up when the output terminal voltage is approaching a final regulated voltage, said output current including a combination of current components which can be combined in any order, said output current including a first current component less a second current component, wherein
the first current component is made to be proportional to the output voltage; and
the second current component is unrelated to the output voltage.

2. The startup circuit of claim 1 wherein the second current component is made to be proportional to the input voltage.

3. The startup circuit of claim 2 wherein the output current includes a third current component unrelated to either the input or the output voltage.

4. The startup circuit of claim 3 including a first current mirror circuit having a first current input and a first current output, with the first current input receiving a current proportional to the output voltage and with the first current output producing the first current component.

5. The startup circuit of claim 4 including a second current mirror circuit having a second current input and a second current output, with the second current input receiving a current proportional to the input voltage and with the second current output producing the second current component.

6. The startup circuit of claim 1 wherein the combination of first and second components can be adjusted in response to startup variables and wherein the startup circuit includes data storage elements which store circuit values corresponding to the startup variables.

7. The startup circuit of claim 6 wherein the circuit values in the storage element can be altered by an end user by way of a programming interface.

8. The startup circuit of claim 7 wherein the programming interface includes a I2C bus.

9. The startup circuit of claim 6 wherein the circuit values corresponding to the startup variables provide the capability of maintaining the power dissipation in the pass transistor within ±20% of some power dissipation level for a period equal to at least half of a startup duration $T_{SU}$ of the converter, with $T_{SU}$ being the time required for the output voltage to increase from 10% of the input voltage magnitude to 90% of the input voltage magnitude.

10. The startup circuit of claim 9 wherein the converter includes a semiconductor chip which includes at least the pass transistor, with the semiconductor chip having an associated thermal resistance $\theta_{JA}$ and wherein the power dissipation level is maintained below a maximum dissipation level Wmax determined at least in part by the associated thermal resistance.

11. A method of controlling a startup of a DC-DC converter having an input terminal and an output terminal, with a capacitor connected to the output terminal, said method comprising:
providing an input voltage to the input terminal;
generating an output current at the output terminal which charges the capacitor thereby causing an output voltage on the output terminal to increase from a low level towards a final regulated output voltage; and
wherein the output current value is adjusted as the capacitor is charged so as to maintain power dissipation in the converter within ±20% of a dissipation level for a duration of at least half a time required for the output voltage to increase from a value equal to 10% of the input voltage to a value equal to 90% of the input voltage.

12. The method of claim 11 wherein the output current includes a combination of current components which can be combined in any order, and wherein the generating an output current includes generating a first current component of the output current which increases in value in response to increases in the input voltage, with first current component being subtracted from at least one other current component of the output current to form the output current.

13. The method of claim 12 wherein the generating an output current includes generating a second current component of the output current which increases in value in response to increases in the output voltage, with the second current component being added to the at least one other current component of the output current to form the output current.

14. The method of claim 13 wherein the at least one other current component of the output current includes a third current component which is independent of changes in the input and output voltages.

15. The method of claim 14 wherein circuit values relating to a magnitude of at least one of the first, second and third current components are stored in the converter and wherein the stored values can be altered to change characteristics of the output current.

16. The method of claim 15 wherein the stored circuit values can be altered using a programming apparatus separate from the converter.

17. A startup circuit for use in a DC-DC converter having an input voltage terminal and an output voltage terminal, with the output voltage terminal connected to an output capacitor and with said converter including a pass transistor for transferring charge from the input terminal to the output terminal so that the output voltage increases to a voltage equal to the input voltage during converter startup, said start up circuit comprising:

a pass transistor control circuit configured to cause the pass transistor to conduct an output current during start up when the output terminal voltage is approaching a final regulated voltage, said output current being adjusted so as to maintain power dissipation in the converter within ±20% of a dissipation level for a duration of at least half a time required for the output voltage to increase from a value equal to 10% on the input voltage to a value equal to 90% of the input voltage.

18. The startup circuit of claim 17 wherein the output current includes a combination of current components which can be combined in any order to produce the output current and wherein the control circuit is further configured to produce a first current component which increases with increases in the output voltage and a second current component which increases with increases in the input voltage and wherein the first and second current components are combined together to form at least part of the output current.

19. The startup circuit of claim 18 wherein the control circuit is further configured to produce a third current component which is independent of changes in the input and output voltages, with the first current component being added to the third current and with the second current component being subtracted from the third current component to produce the output current.

20. The startup circuit of claim 19 further including data storage apparatus and where circuit values relating to at least one of the first, second and third current components are stored in the data storage apparatus and can be altered after being stored.

* * * * *